Oct. 25, 1927.
A. HOROWITZ
1,646,534
CONTAINER FOR CONFECTIONS
Filed April 28, 1925
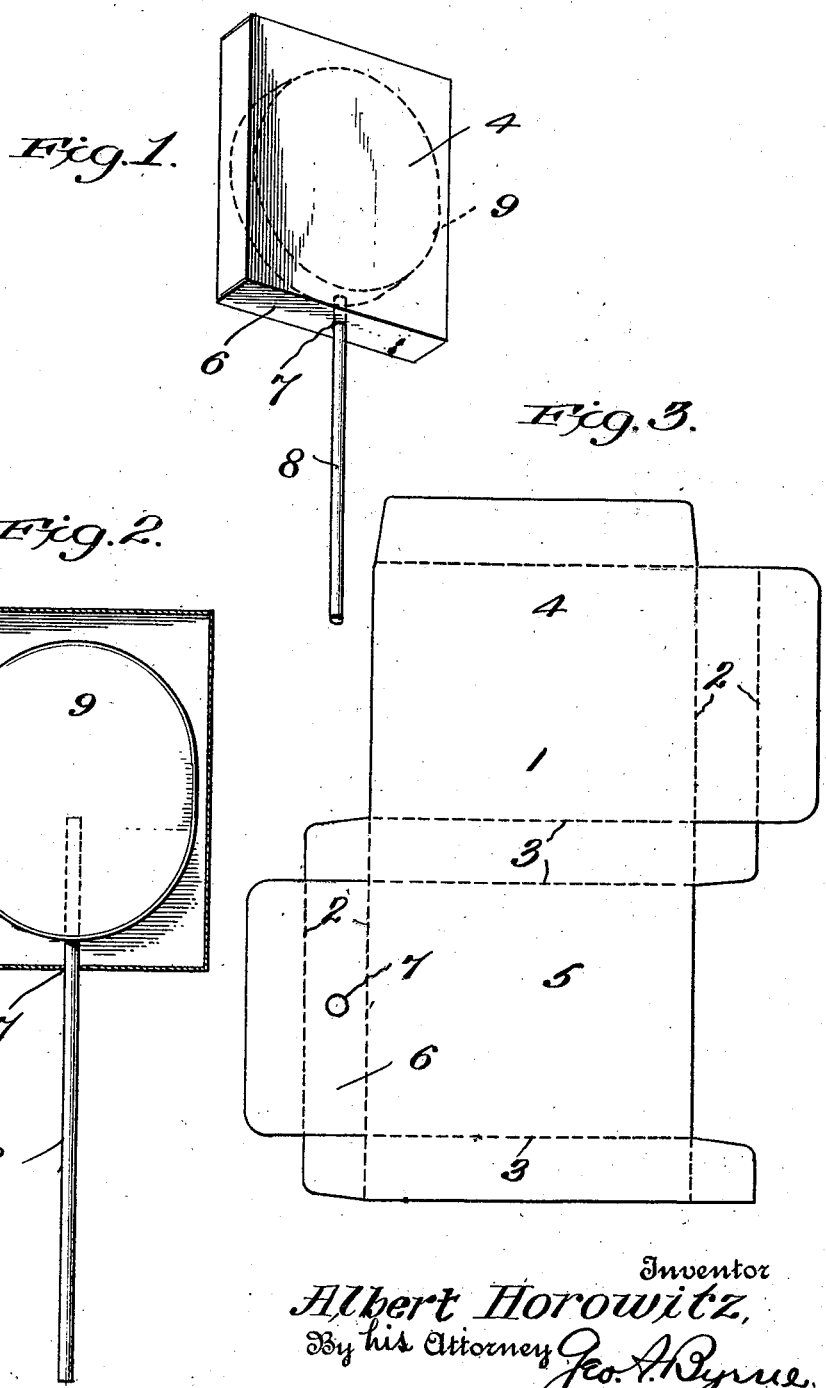
Inventor
Albert Horowitz,
By his Attorney Geo. H. Byrne.

Patented Oct. 25, 1927.

1,646,534

UNITED STATES PATENT OFFICE.

ALBERT HOROWITZ, OF NEW YORK, N. Y.

CONTAINER FOR CONFECTIONS.

Application filed April 28, 1925. Serial No. 26,335.

This invention relates to containers for candy confections and more particularly to a container for holding a single piece of candy generally known as a "lollypop".

The general object of the invention is to provide a neat, and attractive package which when displayed for sale in the windows and on the counters of confectionery stores readily promotes and greatly increases the sale of candy confections of this kind.

Another object of the invention is to provide a sanitary package in the form of a rectangular shaped carton on which may appear attractive advertising matter and the artistic trade mark of the manufacturer.

With the above and other objects and advantages in view, the invention consists in the details of construction to be more fully described and claimed, and illustrated in the accompanying drawings, in which—

Figure 1 is a perspective view of the container and lollypop packed therein.

Figure 2 is a longitudinal sectional view thereof and

Figure 3 is a plan view of the paper blank from which the container is formed.

Heretofore lolly-pops have usually been displayed for sale in bulk form and sometimes the individual pieces have been wrapped in small pieces of paper but as far as I am aware no real attempt has been made to sell the pieces in individual paper cartons.

It is well known in the confectionery trade that the sale of candy is greatly increased when the goods are dressed up in a neat and attractive manner. This is especially so with the individual five and ten cent pieces on the market to-day.

In the present invention I have provided a neat and novel way of packing individual lolly-pops so that the sticks project beyond the package.

This feature greatly adds to the attractiveness of the package and readily promotes its sale.

The package or box is formed from a single blank of cardboard, scored as indicated at 2 and 3 to provide the sides 4 and ends 5 when the box is folded. The flaps on one of the sides and the lower end of the box are coated with a layer of glue so that when the box is made up a means is provided for securing the box in its set up position. The inner face of the box is coated with a layer of paraffin, so as to prevent the edible portion of the confection from sticking to the inner sides and ends of the box. The lower end flap 6 of the box has its central portion perforated as at 7 so as to provide an opening through which the stick 8 of the lolly-pop 9 may project.

The opening 6 is substantially the same diameter as that of the stick or projecting handle of the confection so that when the lolly-pop is packed within the box or carton and the cover is closed a sealed and sanitary package is provided.

The outer sides and ends of the boxes may be decorated with artistic advertising matter and are printed in a color which is used to designate the flavor of the confection within the package.

What I claim is:—

The combination of a lollipop comprising a body of confection and a supporting handle projecting therefrom and a loosely fitting container for the edible portion of the confection comprising a rectangular blank having an intermediate portion forming one side of the container and oppositely disposed portions at the side edges of the blank and opposite sides of the intermediate portion for closing the ends of the container, one of said oppositely disposed portions having an aperture of a size to snugly fit the handle and arranged to permit the same to project therethrough.

In testimony whereof I have hereto affixed my signature on this 23 day of April, 1925.

ALBERT HOROWITZ.